(12) United States Patent
Ferlin

(10) Patent No.: US 9,602,504 B2
(45) Date of Patent: Mar. 21, 2017

(54) STRONG AUTHENTICATION BY PRESENTATION OF A NUMBER

(75) Inventor: Benoit Ferlin, Hallennes-Lez-Haubourdin (FR)

(73) Assignee: ONEY BANK, Croix (FR)

( * ) Notice: Subject to any disclaimer, the term of this patent is extended or adjusted under 35 U.S.C. 154(b) by 0 days.

(21) Appl. No.: 14/006,257

(22) PCT Filed: Mar. 29, 2012

(86) PCT No.: PCT/FR2012/050672
§ 371 (c)(1),
(2), (4) Date: Nov. 27, 2013

(87) PCT Pub. No.: WO2012/131268
PCT Pub. Date: Oct. 4, 2012

(65) Prior Publication Data
US 2014/0075525 A1    Mar. 13, 2014

(30) Foreign Application Priority Data

Mar. 30, 2011   (FR) .................................... 11 52664

(51) Int. Cl.
| | | |
|---|---|---|
| G06F 12/00 | (2006.01) |
| H04L 29/06 | (2006.01) |
| G06Q 20/32 | (2012.01) |
| G06Q 20/38 | (2012.01) |
| G06Q 20/40 | (2012.01) |
| H04M 1/57 | (2006.01) |
| H04M 1/663 | (2006.01) |
| H04M 3/42 | (2006.01) |

(52) U.S. Cl.
CPC ..... *H04L 63/0838* (2013.01); *G06Q 20/3255* (2013.01); *G06Q 20/385* (2013.01); *G06Q 20/4012* (2013.01); *H04M 1/57* (2013.01); *H04M 1/663* (2013.01); *H04M 3/42059* (2013.01)

(58) Field of Classification Search
None
See application file for complete search history.

(56) References Cited

U.S. PATENT DOCUMENTS

| | | | |
|---|---|---|---|
| 6,078,908 A | 6/2000 | Schmitz | |
| 8,423,768 B2* | 4/2013 | Huang | G06F 21/33 713/168 |
| 8,462,920 B2* | 6/2013 | Gonen et al. | 379/93.12 |
| 8,635,454 B2* | 1/2014 | Petillo | H04L 63/06 713/155 |
| 8,667,280 B2* | 3/2014 | Sama | G06F 21/31 713/168 |

(Continued)

FOREIGN PATENT DOCUMENTS

| | | |
|---|---|---|
| DE | 197 18 103 A1 | 6/1998 |
| EP | 1 445 917 A2 | 8/2004 |
| WO | 00/48413 A1 | 8/2000 |

*Primary Examiner* — Farid Homayounmehr
*Assistant Examiner* — Olanrewaju Bucknor
(74) *Attorney, Agent, or Firm* — Sughrue Mion, PLLC

(57) ABSTRACT

Authentication method by one-time password from a user (10) having a computer terminal (11) and a telephone terminal (12) who wishes to access an online resource from an information system (20), the method including a step of triggering a call to said telephone terminal with a caller identifier including the one-time password.

22 Claims, 1 Drawing Sheet

(56) References Cited

U.S. PATENT DOCUMENTS

| | | | |
|---|---|---|---|
| 2003/0219109 A1 | 11/2003 | Malik | |
| 2004/0030935 A1* | 2/2004 | Kai | 713/202 |
| 2006/0294387 A1* | 12/2006 | McCracken et al. | 713/182 |
| 2008/0010687 A1* | 1/2008 | Gonen et al. | 726/28 |
| 2008/0282331 A1* | 11/2008 | Teo | 726/6 |
| 2010/0106975 A1* | 4/2010 | Vandervort | 713/186 |
| 2010/0299731 A1* | 11/2010 | Atkinson | 726/6 |
| 2011/0072500 A1* | 3/2011 | Varghese | 726/7 |
| 2011/0086616 A1* | 4/2011 | Brand | G06Q 20/10 455/411 |
| 2011/0276495 A1* | 11/2011 | Varadarajan | G06F 21/31 705/71 |
| 2011/0277025 A1* | 11/2011 | Counterman | 726/8 |

\* cited by examiner

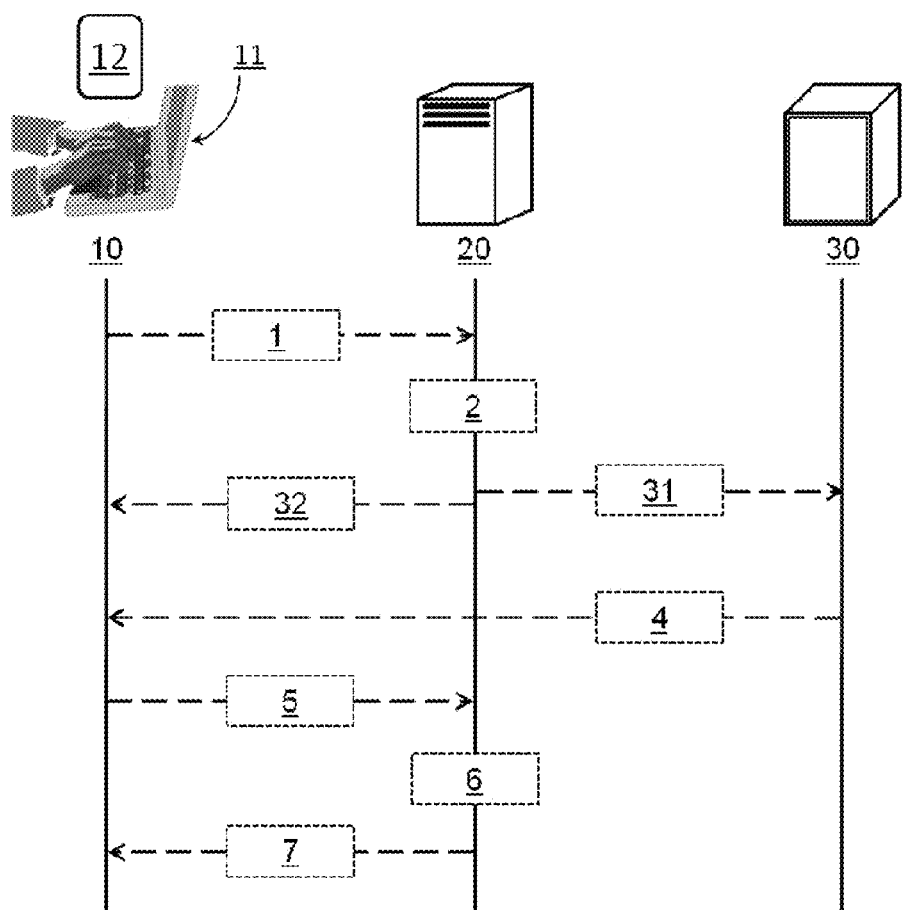

STRONG AUTHENTICATION BY PRESENTATION OF A NUMBER

CROSS REFERENCE TO RELATED APPLICATIONS

This application is a National Stage of International Application No. PCT/FR2012/050672 filed Mar. 29, 2012, claiming priority based on French Patent Application No. 1152664, filed Mar. 30, 2011, the contents of all of which are incorporated herein by reference in their entirety.

The present invention relates to the technical domain of securing access to online resources, and more particularly to the authentication of a user desiring to access an online service from a public computer network such as the Internet.

"Authentication" in computer systems is understood here as being the verification of the identity of an entity (for example a person, a computer, a computer process) in order to authorize access for said entity to resources (for example services, networks, systems, applications). Hereinafter, said entities are designated by the term "user."

Putting resources online on public computer networks such as the Internet offers enormous advantages for users as well as for companies, particularly those of a commercial nature (for example e-banking, e-commerce). The growing number of online services as well as increasing usage are testimony to this.

Naturally, this has caught the interest of cyber criminals (hackers), and the number of programs designed to steal data in order to fraudulently access online resources has greatly increased.

In this regard, robust authentication techniques are more necessary than ever, for users as well as for companies. Indeed, on the one hand, a user should be able to be sure that he is actually accessing the server of the service he is requesting (and to which he may be transmitting his personal data, such as banking information), and on the other hand, that server should also be certain that this user is actually the one that was previously registered with it and is not a fraud. A third party with malicious intentions passing himself off as a legitimate user in order to perform an online banking transaction, for example, certainly creates a problem for the legitimate user as well as for the bank offering this online service.

In the prior art, different methods are distinguished to verify the authenticity of a user working in a client/server mode environment and requesting access to an online resource. Authentication can be done based on several factors:
 a data element known by the user, such as a password;
 an object that the user possesses, for example a magnetic card or a chip card;
 an action that only the user knows, for example a handwritten signature on a touch screen;
 a physical characteristic specific to the user, such as a fingerprint.

Currently, the most widely used method for authenticating a user to a remote server is based on a static password combined with an identifier (login). The advantage of such a method is that it can be implemented entirely by software, thus avoiding the cost of additional equipment (hardware).

However, espionage carried out on network connections in order to collect identities of legitimate users is a drawback to this method. Identities that are stolen in this way can be used later. The techniques of hashing or encrypting passwords cannot completely resolve this problem because they only move the threat from the network link to the user terminal, where it is certainly not unusual to find numerous malicious applications (malware).

Authentication techniques based on means furnished to users, such as an authentication token, a chip card, smart card or USB key, have the disadvantage of requiring additional hardware cost.

Moreover, biometric authentication methods are generally complex and require a tedious first step of characterization.

In order to remedy the limits of single-factor authentication methods, particularly the use of static passwords, authentication solutions have appeared that combine two factors: a data element known by the user (for example a password) and an item that the user possesses (such as a telephone number or e-mail address). This is known as strong authentication. Among these methods, there is the authentication solution based on one-time passwords (also called OTP).

As its name indicates, the one-time password (OTP) can only be used as means of authentication for a single session. Thus, a new OTP is generated, usually randomly or pseudo-randomly, and then communicated to the user upon each new request for access sent by the user to the remote server. The user submits this OTP to the remote server as evidence of the authenticity of his identity, which he declared by means of his login/password, for example. Consequently, the theft of logins/static passwords, whether from the user terminal or from the network link connecting the user terminal to the server, is useless since an OTP becomes invalid once it has been used.

In order to guarantee real security, an OTP is generally communicated to the user through a channel other than the one established between the user terminal and the server. Indeed, an OTP is generally sent to the user by SMS (Short Service Message), by MMS (Multimedia Messaging Service) or by voice message using the second authentication factor, i.e., the telephone number that the user has and that has previously been furnished to the remote server.

However, sending an OTP (by SMS, MMS or voice message, for example) on a telephone usually results in additional financial cost for the suppliers of online services (since to date, this is not free). Obviously, sending OTPs by SMS monthly to a thousand customers using an online service offered by a small- to medium-size company represents a significant financial burden for that company.

An object of the present invention is to remedy the aforementioned disadvantages.

Another object of the present invention is to deploy a strong authentication solution at a lower cost.

Another object of the present invention is to reduce the financial cost required to guarantee the security of e-commerce Websites.

Another object of the invention is to allow a user, typically an Internet user, to access online services simply and securely.

Another object of the present invention is to propose a strong authentication method making it possible to secure access to online resources from an insecure network.

To that end, according to a first aspect, the invention relates to an authentication method by one-time password from a user having a computer terminal and a telephone terminal who wishes to access an online resource from an information system, said method including a step of triggering a call to said telephone terminal with a caller identifier comprising the one-time password.

According to a second aspect, the invention relates to an authentication system by one-time password from a user having a computer terminal and a telephone terminal who wishes to access an online resource from an information system, said system including a private automatic branch exchange for triggering a call to said telephone terminal with a caller identifier comprising the one-time password.

According to a third aspect, the invention relates to a computer program implemented on a memory device, capable of being run on an electronic data processing unit and comprising instructions for the implementation of the method summarized above.

Other characteristics and advantages of the invention will appear more clearly and in more detail from the following description of preferred embodiments, provided with reference to the appended FIG. 1, which diagrammatically illustrates a functional representation of one embodiment.

Represented in FIG. 1 is a user 10 wishing to remotely access, via a computer terminal 11, an online resource made available by an information system 20.

The computer terminal 11 can be any user equipment enabling a user 10 to connect to a computer network, particularly the Internet, from which the online resource offered by the information system 20 is accessible. Examples of the computer terminal 10 are a fixed/portable computer, personal or public, a PDA (Personal Digital Assistant) or a smartphone.

The information system 20 can be any hardware and/or software computer means making an online resource available to the user 10, particularly an online service, accessible from a computer terminal 11. An application server, a Web server hosting an e-commerce Website, or a plurality of cooperating servers, are examples of the information system 20.

The user 10 also has a telephone terminal 12 associated with at least one call number (telephone number). Said telephone terminal 12 is, for example,

- a mobile telephone, a smartphone or a PDA including a SIM (Subscriber Identity Module) or USIM (Universal Subscriber Identity Module) card;
- a fixed analog or digital telephone;
- a softphone having a telephone number (Skype™In, for example).

In one advantageous implementation, the telephone terminal 12 is a mobile telephone or a smartphone. Obviously, this case is not limiting.

The telephone terminal 12 allows the number of the caller (Caller_ID for Caller Identification or CLIP for Calling Line Identification Presentation) to be presented to the called party. In other words, the telephone terminal 12 provides the number, or more generally the caller identifier, to the called party. The caller identifier can be displayed on the screen of the telephone terminal 12, if there is one, or on a separate device.

As a variation or in combination, the identifier of an incoming call to the telephone terminal 12 can be

- displayed from a directory included in said terminal (for example log of calls, missed calls, no-answer calls), and/or
- obtained by dialing a certain number (for example, for a France Télécom™ subscriber, dialing 3131 for the number of the last caller).

In particular, the computer terminal 11 and the telephone terminal 12 can be comprised of a single piece of user equipment such as:

- a fixed/mobile computer comprising a softphone; or
- a smartphone or a PDA allowing data service (DATA) in addition to its telephone function.

In one implementation of an embodiment illustrated in FIG. 1, the user 10 wishes to access a resource provided online by the information system 20 and requiring strong authentication (step 1 in FIG. 1). By way of example, the user 10 wishes to perform an online transaction (for example a transfer, purchase, sale) on a Website (banking or e-commerce, for example) hosted by the information system 20. In order to connect to the remote information system 20 of the Website he wants to access, the user 10 uses the computer terminal 11 in the conventional way by entering the Web address of the site.

Because it is an online resource requiring strong authentication, the information system 20 is arranged to verify the authenticity of the identity of the user 10, which he has declared, for example, by a login/password. To do this, the information system 20 (step 2 in FIG. 1)

- stores in memory the request of the user 10;
- searches for the telephone number (i.e., the second authentication factor) that the user 10 has previously provided during an earlier session. Of course, this assumes that the user 10 has previously filled out his profile (at least a login, password and telephone number) in the information system 20, indicating the telephone number of his telephone terminal 12;
- generates an OTP that the user 10 cannot know in advance. Said OTP is generally generated randomly or pseudo-randomly.

Next, the information system 20

- communicates (step 31 in FIG. 1) the generated OTP and the telephone number of the user 10 to the private automatic branch exchange 30 (PBX or PABX), and
- informs (step 32 in FIG. 1) the user 10
  - that he is immediately going to receive a call at the telephone number he has previously provided (i.e., the telephone number of the telephone terminal 12 in his possession); and
  - that he must submit (return) the caller identifier (Caller_ID).

The PABX 30 can also be a PABX IP, which is a development of the traditional PABX towards IP (Internet Protocol).

Advantageously, one of the native functionalities of the PABX 30 is the ability to change the number of the caller (Caller_ID) on request.

Therefore, by using the telephone number and the OTP that are transmitted to it from the information system 20, the PABX 30 is arranged to (step 4 in FIG. 1) trigger a call to the telephone terminal 12 of the user 10 while presenting the OTP in the caller identifier (that is, in the Caller_ID). As a result, the OTP is sent directly to the display of the telephone terminal 12, in lieu of presenting the caller's number.

It should be noted that the purpose of the call triggered by the PABX 30 to the telephone terminal 12 is to furnish the OTP, and not to establish a conversation. Said call therefore only takes the time that is necessary and sufficient to provide the OTP to the telephone terminal 12, in other words, before the user 10 picks up the receiver. Consequently, the PABX 30 is programmed to interrupt the call after the first or second ring, for example.

The user 10 enters (step 5 in FIG. 1) the caller identifier (Caller_ID) that is displayed on his telephone terminal 12, as requested by the information system 20. By way of example, the user 10 enters the caller identifier in a dedicated zone (a certain field in an electronic form, for example), and submits it to the information system 20.

As a variant, the information system 20 requests that the user 10 only return to it a specific part of the caller identifier of an incoming call that he will immediately receive on his telephone terminal 12.

The information system 20 verifies (step 6 in FIG. 1) the validity of the message returned to it by the user 10, and consequently authorizes or refuses the access requested by the user 10. For this purpose, the information system 20 comprises means making it possible to verify agreement between the message submitted by the user 10 and the OTP that has been generated and communicated to the PABX 30. In the event of agreement of the content submitted by the user 10 (step 5 in FIG. 1) with what was generated by the information system 20, the user 10 receives certain authentication by the information system 20. In this event, the information system 20 directs the user 10 to the requested resource.

The user 10 is informed of the results of his authentication (step 7 in FIG. 1).

In one illustrative implementation of the method described above, the Internet user 10 issues a message from his computer 11, requesting access to an application server hosting a banking site in order to make a certain transaction (step 1 in FIG. 1); the application server stores in memory the request from the Internet user 10, retrieves the telephone number of said user (second authentication factor of the Internet user 10), and generates a one-time password (OTP) (step 2 in FIG. 1); the application server communicates the generated one-time password and the telephone number of the Internet user 10 to the PABX 30 (step 31 in FIG. 1); the application server informs the Internet user 10 that in a moment, he will receive a call—at the telephone number that he has previously provided—and that the caller identifier (Caller_ID) is the one-time password that he must submit (step 32 in FIG. 1); the PABX 30 makes a call to the telephone number of the Internet user 10, displaying in the caller identifier the one-time password generated by the application server; the Internet user 10 submits the caller identifier displayed to him on his telephone 11 (step 5 in FIG. 1); the application server verifies the agreement between the one-time password it has generated and the one submitted by the Internet user 10 (step 6 in FIG. 1); the application server informs the Internet user 10 of the success/failure of his authentication (step 7 in FIG. 1).

In another illustrative implementation of one embodiment, the user 20 is provided with user equipment combining a telephone terminal and a computer terminal such as a smartphone, or a fixed/portable computer, for example. In this case, the user 10
- is connected to the remote server 20 from his smartphone (for example, he opens the Web page of an online service offered by the remote server 20);
- is identified to the remote server 20 by means of at least his own identifier (a login and a password, for example);
- requests connection to the online service from the remote server 20 (for example, requests that an online transaction be carried out);
- the remote server 20 searches for the telephone number associated with the identity declared by the user 10, this information being communicated to it during a previous phase (for example, a phase of registration for the online service);
- the remote server 20 generates an OTP;
- the remote server 20 transmits the telephone number of the user 20 and the generated OTP to the PABX 30;
- the remote server 20 asks the user to submit the caller identifier (Caller_ID) from the call he is going to receive in a moment;
- the PABX 30 triggers a call to the telephone number transmitted to it while presenting the OTP in the caller identifier (Caller_ID);
- the user 10 enters the caller identifier (Caller_ID) of the call he has just received and submits it to the remote server 20 (the user 20 [sic: 10] enters the caller identifier (Caller_ID) in a form that he submits to the remote server, for example);
- the remote server 20 verifies the agreement between the message submitted by the user and the generated OTP, and informs the user of the results (that is, the success or failure of his authentication).

In a preferred embodiment, when the computer terminal 11 and the telephone terminal 12 are included in a single piece of user equipment (particularly a computer or a smartphone), a software application is arranged to recover the caller identifier from the last incoming call in order to submit it to the remote server. In one particular implementation, said software application is launched by the user from the electronic form providing access to the online service. As a variant, said application is launched automatically as soon as the user has requested access to the online service.

In one embodiment, the software application is attached to the electronic form for access to the online service. Advantageously, said software application makes it possible to reduce the involvement of the user in the authentication procedure.

In another embodiment, when the telephone terminal 12 and the computer terminal 11 are not included in a single piece of user equipment (that is, two independent user terminals), the software application, distributed between the two terminals 11 and 12, makes it possible to send to the computer terminal 11 the caller identifier from the last incoming call to the telephone terminal 11. For this purpose, the software application can use, for example, a short-range radio communication interface (Bluetooth™, for example) shared by the computer terminal 11 and the telephone terminal 12.

It should be noted that, according to the present invention, an OTP can be generated according to any known method in the state of the art (software, hardware, random/pseudo-random, dependent/independent of authentication factors, for example).

In one embodiment, the caller identifier (Caller_ID) displayed to the user 10 allows the OTP generated by the information system 20 to be extracted or deduced therefrom (by means of a selection or decryption function, for example). This function is provided to the user 10 on his computer terminal 11 and/or his telephone terminal 12.

In particular, the authentication procedure by a one-time password described above can be deployed in combination with other security methods (secure exchange protocols such as SSH or SSL, for example).

The method that has just been described has a certain number of advantages. Indeed, it makes it possible
- to ensure a mutual authentication between the user 10 and the information system 20;
- to reduce the cost of an authentication by OTP: compared to an SMS/MMS, a call is generally free;
- to ensure the security of the authentication process: the identity of the user (login/password, for example) and the OTP are transmitted on two different communication channels.

The invention claimed is:

1. An authentication method by one-time password from a user having a computer terminal and a telephone terminal who wishes to access an online resource from a remote information system requiring entry of the one-time password into the computer terminal, said authentication method including a step of an automatic branch exchange triggering a call to said telephone terminal with a caller identifier comprising the one-time password, a telephone number of the telephone terminal being previously provided to said remote information system and received by the automatic branch exchange from the remote information system.

2. The method according to claim 1, further comprising a step of declaring an identity of the user to the remote information system and a step of requesting access from the remote information system.

3. The method according to claim 1, further comprising a step of the remote information system generating the one-time password.

4. The method according to claim 1, further comprising a step of the automatic branch exchange receiving from the remote information system the one-time password in addition to the telephone number associated with the user.

5. The method according to claim 1, further comprising a step of submitting to the remote information system the caller identifier of the call from the automatic branch exchange to the telephone terminal.

6. The method according to claim 1, further comprising a step of verifying an agreement between a message submitted to the remote information system and a one-time password generated by the remote information system.

7. The method according to claim 1, wherein an identity of the user comprises at least one identifier of the user.

8. The method according to claim 1, wherein the call is interrupted after the one-time password is provided to the telephone terminal.

9. The method according to claim 8, wherein the call is interrupted after a predetermined number of rings.

10. The method according to claim 8, wherein the call is interrupted before a second ring.

11. The method according to claim 8, wherein the call is interrupted before a third ring.

12. The method according to claim 1, wherein the one-time password is communicated to the user via the triggered call without the user answering the call.

13. A system for authenticating by one-time password a user provided with a computer terminal and a telephone terminal who wishes to access an online resource from a remote information system requiring entry of the one-time password into the computer terminal, said system including a private automatic branch exchange for triggering a call to said telephone terminal with a caller identifier including the one-time password, the telephone private automatic branch exchange in communication with the remote information system for receiving a number of the telephone terminal.

14. The system according to claim 13, wherein the remote information system comprises an application server:
that generates one-time passwords;
that communicates a one-time password and a telephone number to a private automatic branch exchange;
that verifies an agreement between a generated one-time password and a message submitted to the remote information system.

15. The system according to claim 13, wherein the computer terminal and the telephone terminal are included in a single piece of user equipment.

16. A computer program implemented on a memory device, capable of being run on an electronic data processing unit and comprising instructions for implementation of an authentication method by one-time password from a user having a computer terminal and a telephone terminal who wishes to access an online resource from a remote information system requiring entry of the one-time password into the computer terminal, said authentication method including a step of a telephone private automatic branch triggering a call to said telephone terminal with a caller identifier comprising the one-time password, a telephone number of the telephone terminal being previously provided to said remote information system and received by the automatic branch exchange from the remote information system.

17. The computer program according to claim 16 further comprising a software application arranged to send to a computer terminal the caller identifier of a last incoming call to a telephone terminal.

18. A method for authenticating a user having a computer terminal and a telephone terminal, the user wishing to access an online resource from a remote information system requiring entry of authentication information into the computer terminal, said method comprising:
the remote information system receiving a request by the user to access the online resource;
the remote information system generating the authentication information;
the remote information system communicating the authentication information and a telephone number associated with the telephone terminal to a telephone exchange
the telephone exchange triggering a call to the telephone terminal with the authentication information; and
the remote information system subsequently receiving from the user information containing at least the authentication information; and
wherein the authentication information comprises a one-time password.

19. The method according to claim 18, further comprising the remote information system storing in memory the request from the user and searching for the telephone number associated with the telephone terminal previously provided by the user.

20. The method according to claim 18, further comprising the remote information system informing the user that the user will receive a call at the telephone number associated with the telephone terminal, the call containing the authentication information, and instructing the user to submit the authentication information to the remote information system.

21. The method according to claim 18, wherein the authentication information subsequently received by the remote information system is contained in a caller identification for the triggered call by the telephone exchange for triggering a call to the telephone terminal with the authentication information further comprising submitting to the remote information system the caller identifier of a call received on the telephone terminal.

22. The method according to claim 18, further comprising verifying an agreement between the information containing at least the authentication information received by the remote information system from the user message and the authentication information communicated to the telephone exchange.

* * * * *